Oct. 19, 1943.   P. MACA   2,332,329
GLASS GRINDING AND POLISHING MACHINE
Filed March 20, 1941   12 Sheets-Sheet 3

Inventor:
Paul Maca
By Wallace and Cannon
Attorney

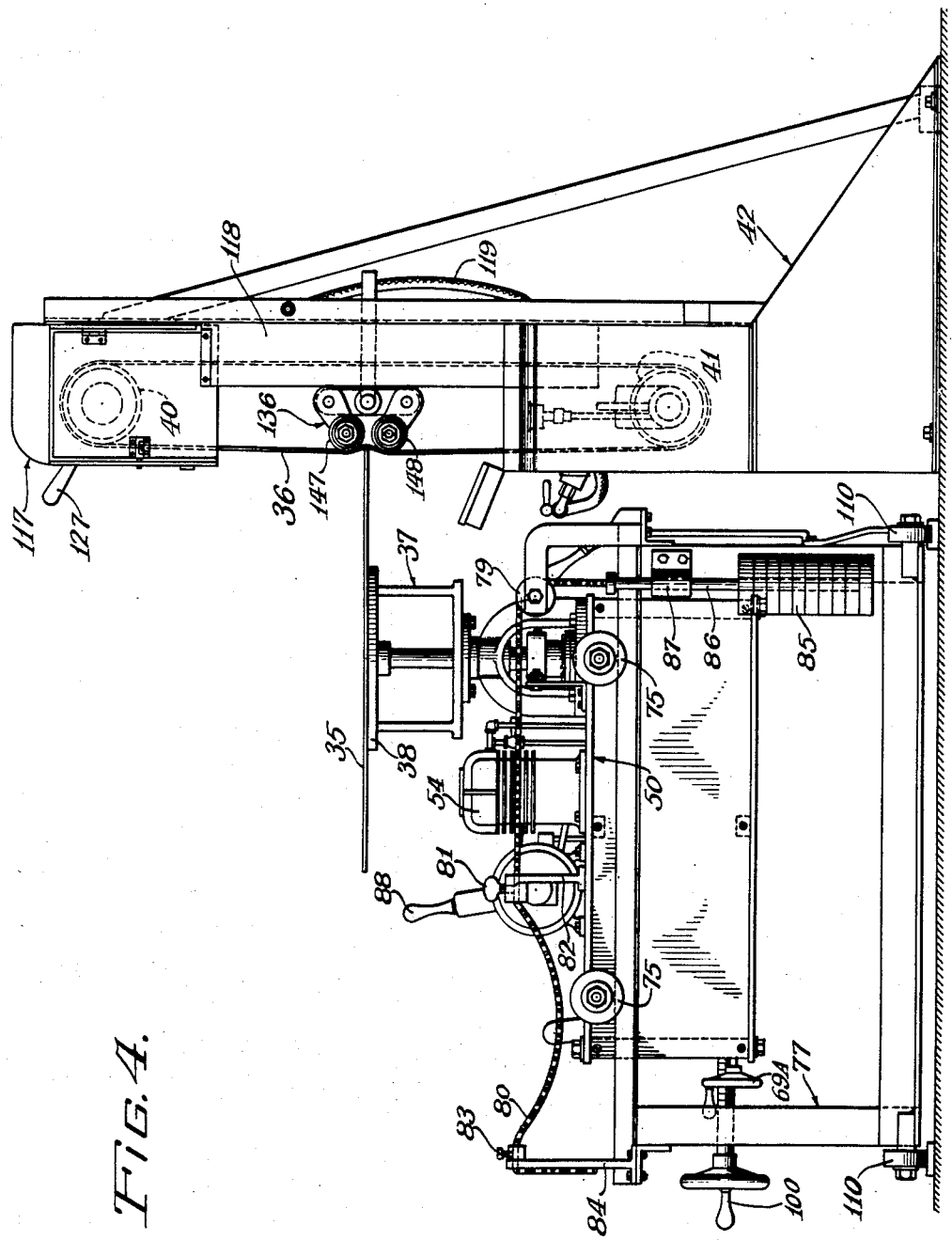

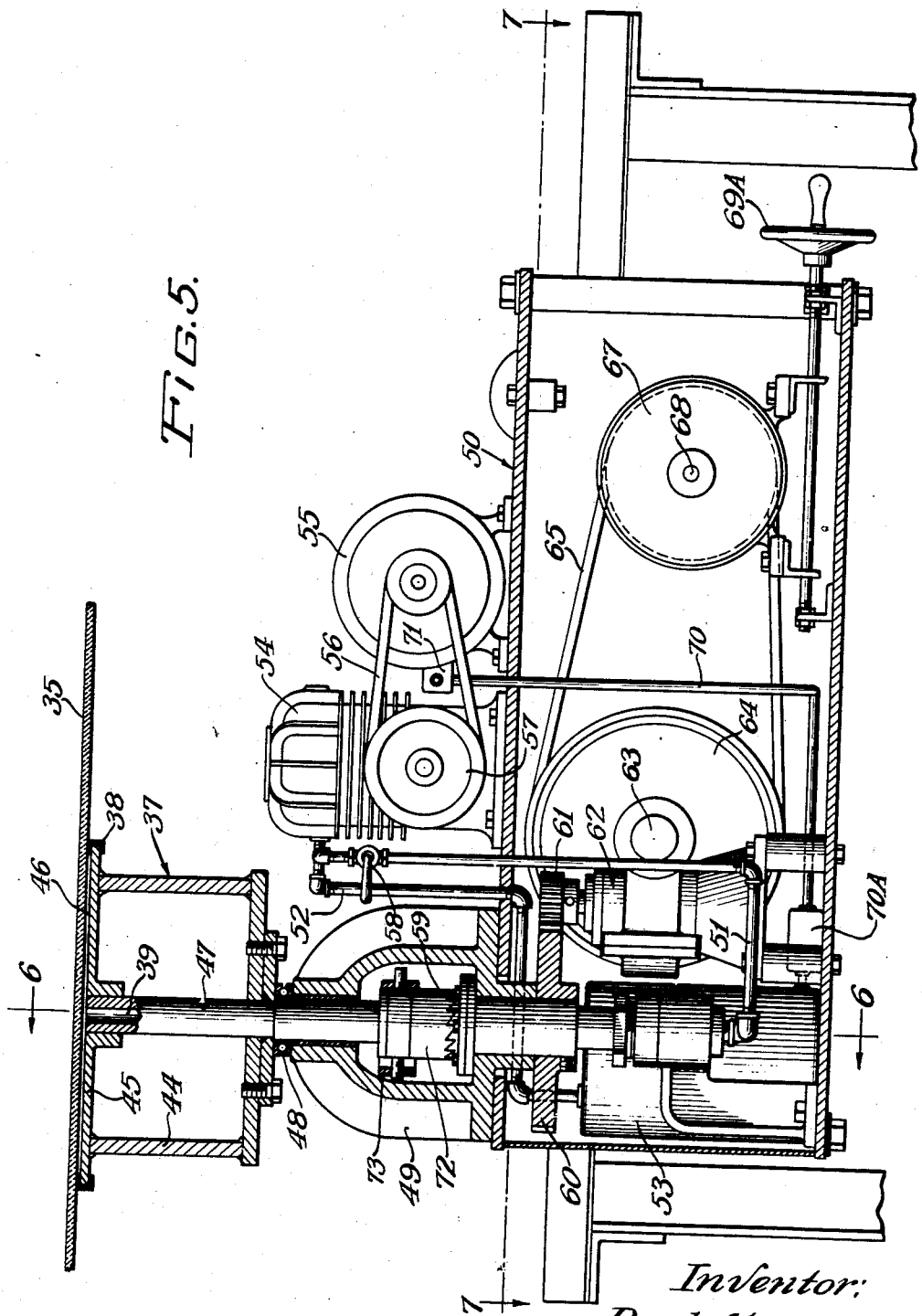

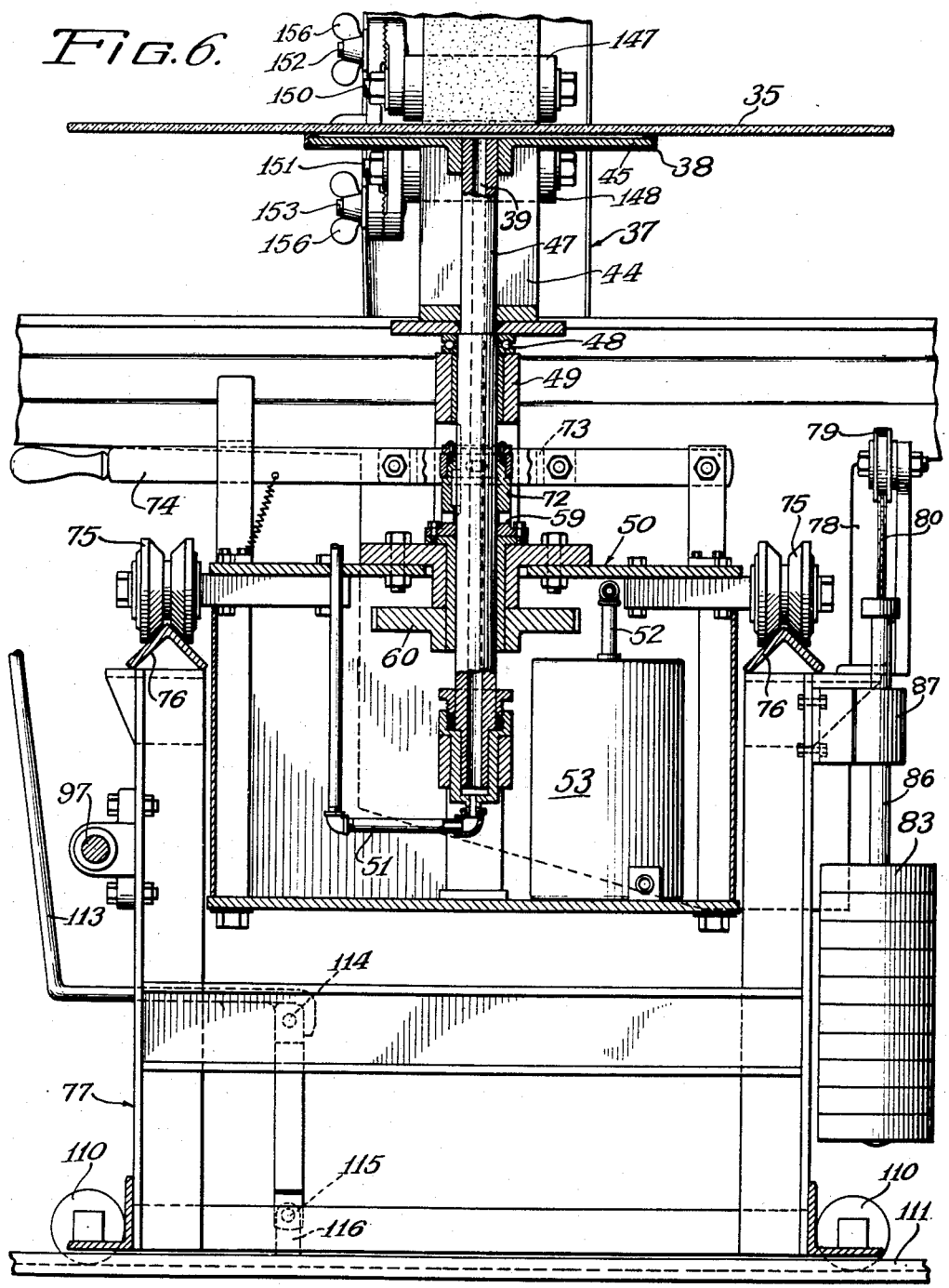

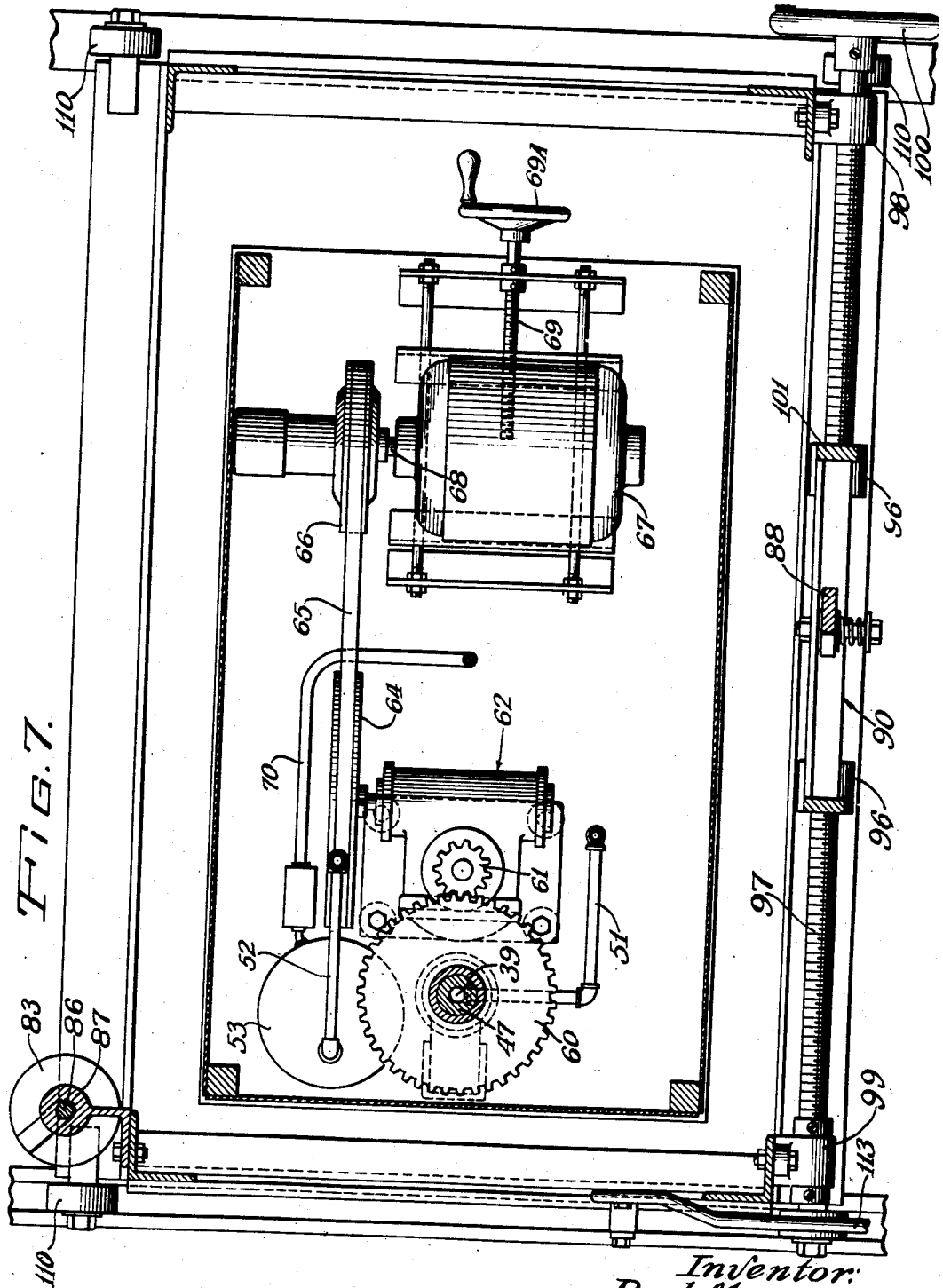

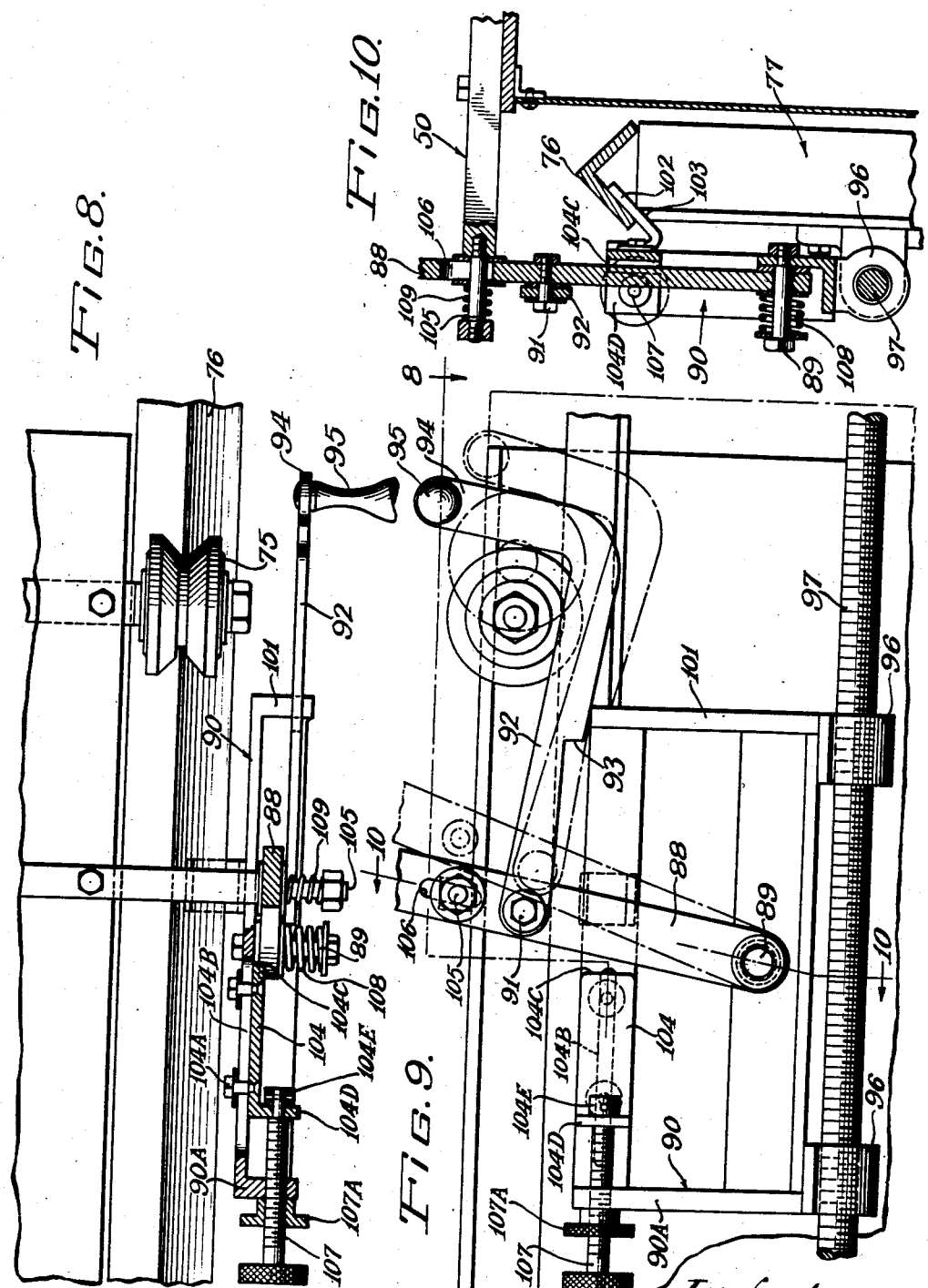

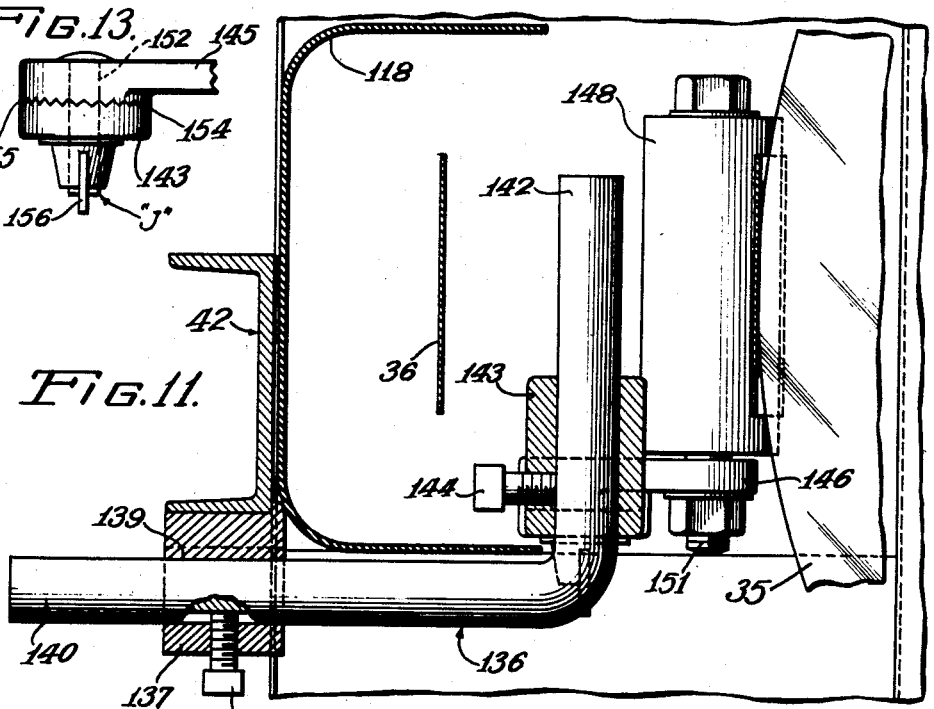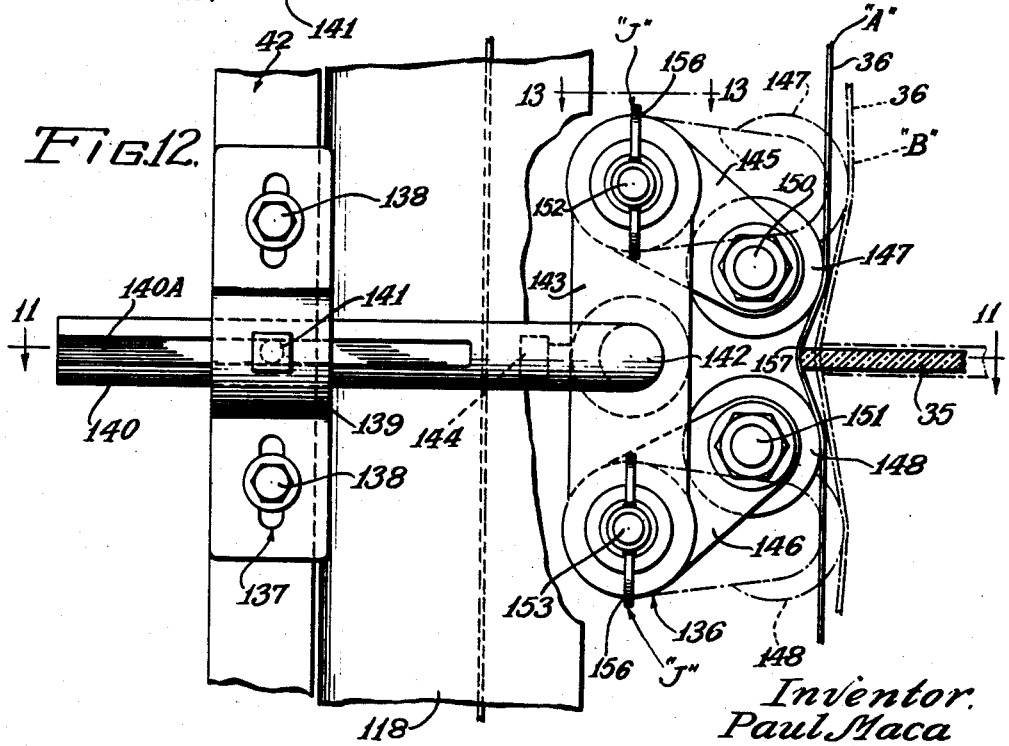

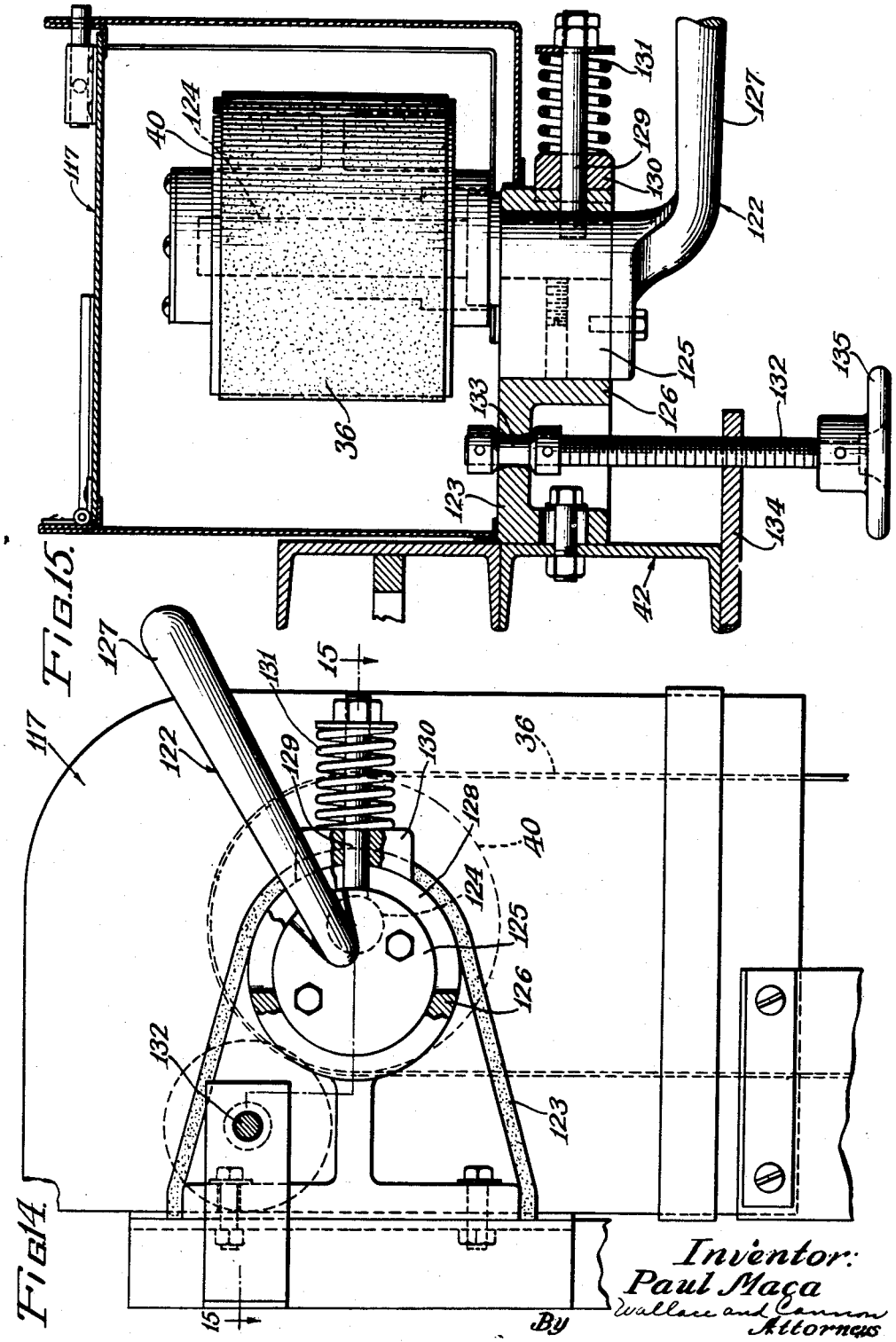

Oct. 19, 1943.   P. MACA   2,332,329
GLASS GRINDING AND POLISHING MACHINE
Filed March 20, 1941   12 Sheets-Sheet 11

Inventor
Paul Maca
By Wallace and Cannon
Attorneys

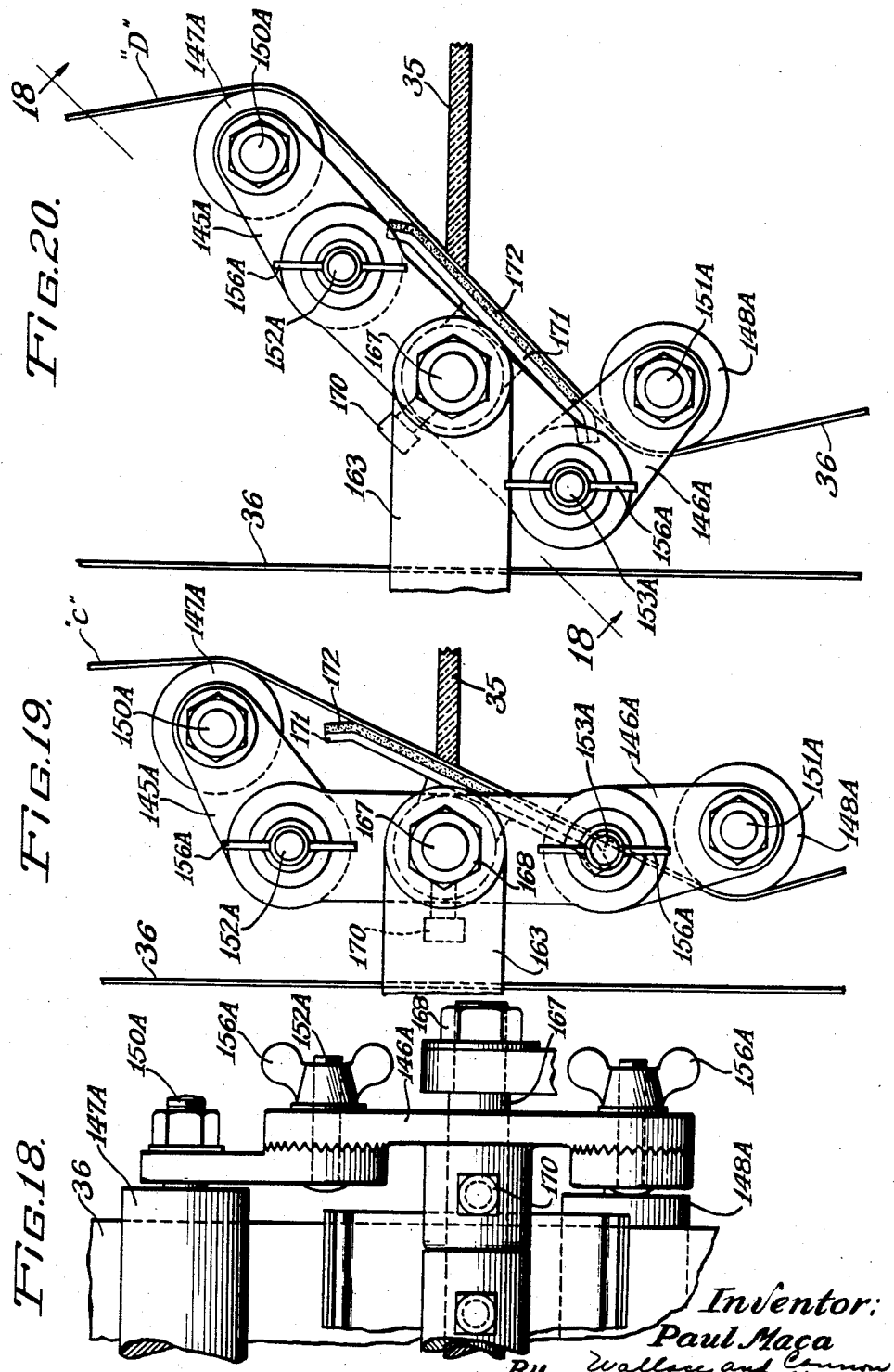

Patented Oct. 19, 1943

2,332,329

UNITED STATES PATENT OFFICE 2,332,329

GLASS GRINDING AND POLISHING MACHINE

Paul Maca, Chicago, Ill.

Application March 20, 1941, Serial No. 384,295

9 Claims. (Cl. 51—145)

This invention relates to a glass grinding and polishing machine.

More particularly, this invention relates to a glass grinding and polishing machine which is particularly adapted for grinding and polishing the peripheral edges or edge portions of glass or like ceramic sheets.

Heretofore in the glass industry and in like ceramic arts, in order to grind or polish the peripheral edge of a sheet of glass or like ceramic material, it has been customary for the workman to hold the sheet against a rotating abrasive element or wheel and it will be appreciated that this manual method has a number of disadvantages in that it is not only slow and laborious but also has the additional disadvantage which resides in the fact that it is impossible in this way to provide a uniformly shaped peripheral edge or edge portion of a desired shape or configuration on a glass or like ceramic sheet.

It will also be appreciated that in the practice of prior art manual method of grinding, smoothing or polishing the peripheral edge or edge portions of glass or like ceramic sheets it was impossible to assure that all of the jagged or sharp surfaces or points thereon would be eliminated and the peripheral edge of the glass sheet made uniformly smooth during the grinding or polishing operation with the result that jagged or sharp points would frequently be found upon the peripheral edge or edge portion of glass sheets thus manually polished or buffed.

Another disadvantage in the use of the prior art practice of manually grinding glass or like ceramic sheets is that it was impossible by the use of this manual method to provide uniformly beveled edges on such glass or like ceramic sheets.

A further disadvantage in the use of the prior art practice of manually grinding the peripheral edge or edge portion of glass or like ceramic sheets resided in the fact that it was difficult in the use of that method to provide a uniform selected or desired shape or configuration in the peripheral edge or edge portion of glass or like ceramic sheets, including a flat or straight sided edge, a beveled edge, a rounded convex edge, and a rounded concave edge.

An additional disadvantage of the prior art practice of grinding, polishing or smoothing glass and like ceramic sheets resided in the fact that it was impossible particularly in the case of circular glass sheets to assure that the sheet would not be ground slightly out of its true or initial shape during the grinding or polishing operation.

Accordingly, an object of this invention is to effect and realize novel apparatus by means of which the peripheral edge or edge portions of a sheet of glass or like ceramic material may be expeditiously and mechanically ground or polished to provide a peripheral edge or edge portion of a desired shape or configuration thereo.

Another object of the invention is to provide a novel apparatus by means of which the peripheral edge of a circular glass or like ceramic sheet or disc may be expeditiously ground or polished to provide a uniformly shaped edge of a desired configuration thereon.

Another object of the invention is to provide a glass polishing and grinding apparatus which includes a novel device for holding a circular sheet of glass or like ceramic material in position during the operation of grinding or polishing its peripheral edge.

Another object of the invention is to provide a novel and efficient device for grinding or polishing the peripheral edge of a circular glass sheet or disc.

Another object of the present invention is to employ a continuously movable endless abrasive belt in the new glass grinding and polishing machine for grinding or polishing the peripheral edge of a circular or non-circular or angularly formed sheet of glass or like ceramic material and to provide a novel device, embodied in the new glass grinding and polishing machine, for controlling and varying the angle or path of travel at which the abrasive surface of the movable abrasive endless belt engages the peripheral edge of the glass or like ceramic sheet during the grinding or polishing operation.

Another object of the invention is to vary and control the angle or path of travel at which the abrasive surface of the endless abrasive belt engages the peripheral edge of a glass or like ceramic sheet, during the grinding or polishing operation, in such a manner as either to grind the peripheral edge of a glass or like ceramic sheet or to impart a desired shape or configuration thereto such, for example, as a straight-sided or a beveled or a rounded edge thereon, depending upon the path of travel of the movable abrasive belt at the point where the abrasive surface thereof engages the peripheral edge or edge portion of the glass or like ceramic sheet during the grinding or polishing operation.

A further object of the invention is to provide, in one embodiment thereof, novel manipulative means for adjusting the turntable-supporting carriage and the turntable carried thereby relative to or toward and away from the abrasive belt which is embodied in the new glass grinding and polishing machine.

Another object of the invention is to provide, in one form thereof, novel manipulative means for yieldingly urging the peripheral edge portion of a glass disc supported on a turntable which is embodied in said form of the invention, against the abrasive belt which is embodied in the said form of the new glass grinding and polishing machine; and to control by said novel manipulative means, the yielding contact or pressure of the peripheral edge portion of the glass disc against the abrasive belt so that said yielding contact or pressure may be relatively slight or less at first, to enable the jagged surfaces or sharp points on the peripheral edge of the glass disc to be eliminated, without tearing or rupturing the abrasive belt, whereupon the yielding pressure or contact of the peripheral edge portion of the glass disc against the abrasive surface of the abrasive belt may be increased to complete the grinding or polishing operation.

A further object of the invention is to provide, in one form of the invention, a novel device for adjusting a circular glass sheet or disc into and out of contact with a moving abrasive endless belt which is embodied in the new glass grinding and polishing machine.

Another object of the invention is to provide a novel device, which is embodied in one form of the invention, for urging the peripheral edge portion of a circular glass sheet or disc into engagement with the movable abrasive endless belt which is embodied in the new glass grinding and polishing machine.

A further object of the invention is to provide novel devices, which are embodied in one form of the invention, for continuously rotating a substantially circular glass or like ceramic sheet or disc with its peripheral edge portion in engagement with the abrasive surface of a continuously moving abrasive endless belt which, at the same time, yieldingly urge the peripheral edge portion of said substantially circular glass or like ceramic sheet into engagement with the abrasive surface of the continuously moving abrasive endless belt.

An additional object of the invention is to construct and arrange one form of the new machine in such a manner that the supporting carriage, including the turntable, with a circular sheet of glass or like ceramic material disposed thereon, may be moved or adjusted laterally relative to the movable abrasive endless belt so as to utilize, at different times, all of the abrasive surface of the movable abrasive endless belt, that is, the entire width of the same.

A further object of the invention is to provide a novel device by means of which the abrasive surface of the abrasive endless belt which is embodied in the new glass grinding and polishing machine may be held in flat contact with the peripheral edge of a glass or like ceramic sheet during the grinding or polishing operation so as to form, as may be desired, either a straight-sided peripheral edge or a beveled edge on the peripheral edge of the glass sheets.

Other and further objects of the present invention will be apparent from the following description and claims and are illustrated in the accompanying drawings which, by way of illustration, show preferred embodiments and the principles thereof and what I now consider to be the best modes in which I have contemplated applying those principles. Other embodiments of the invention embodying the same or equivalent principles may be used and structural changes may be made as desired by those skilled in the art without departing from the present invention and the purview of the appended claims.

In the drawings,

Fig. 4 is a side elevational view of that form of the novel glass grinding and polishing apparatus which is shown in Figs. 1 to 3, inclusive;

Fig. 5 is an enlarged vertical sectional view on line 5—5 in Fig. 2, showing the construction of the turntable and sheet-holding device and associated parts;

Fig. 6 is an enlarged vertical sectional view on line 6—6 in Fig. 5, showing the construction of the turntable-supporting carriage and the guiding means therefor;

Fig. 7 is a view on the line 7—7 in Fig. 5, partly in section and partly in top plan;

Fig. 8 is a fragmentary sectional view on the line 8—8 in Fig. 9, partly in section and partly in plan, showing a part of the manipulative mechanism for latching and operating the turntable-supporting carriage;

Fig. 9 is a fragmentary side elevational view of the structure which is shown in Fig. 8;

Fig. 10 is a sectional view on line 10—10 in Fig. 9, and showing, among other things, the guiding structure for the turntable-supporting carriage;

Fig. 11 is an enlarged sectional view on line 11—11 in Fig. 12 showing one form of the novel device embodied in the new glass grinding and polishing machine for controlling the path of travel of the abrasive endless belt at the point where, or the angle at which, the abrasive belt engages the peripheral edge of a circular glass or like ceramic sheet;

Fig. 12 is a fragmentary side elevational view of the device which is shown in Fig. 11;

Fig. 13 is a fragmentary detail top plan view on line 13—13 in Fig. 12;

Fig. 14 is an enlarged detail elevational view showing a novel belt-tensioning device which is embodied in the form of the new glass grinding and polishing machine which is shown in Figs. 1 to 13, inclusive, for tensioning the movable abrasive endless belt;

Fig. 15 is a sectional top plan view on line 15—15 in Fig. 14, of the belt-tensioning device which is shown in Fig. 14;

Fig. 18 is an elevational view, on line 18—18 in

Figure 16:
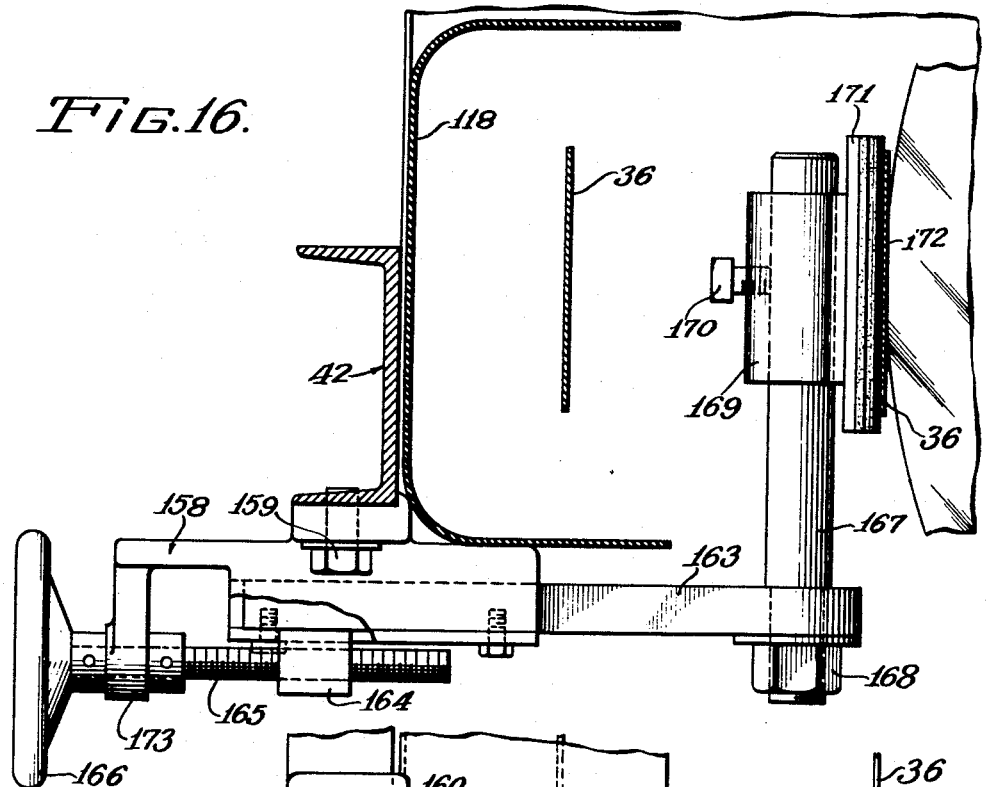
Fig. 16 is a sectional view, on line 16—16 in Fig. 17, showing a device which is embodied in the new glass grinding and polishing machine for holding the movable abrasive endless belt in flat contact with the peripheral edge of a sheet of glass or like ceramic material and positioned to provide a straight-sided edge on the peripheral edge of said sheet of glass or like ceramic material.
Figure 17:
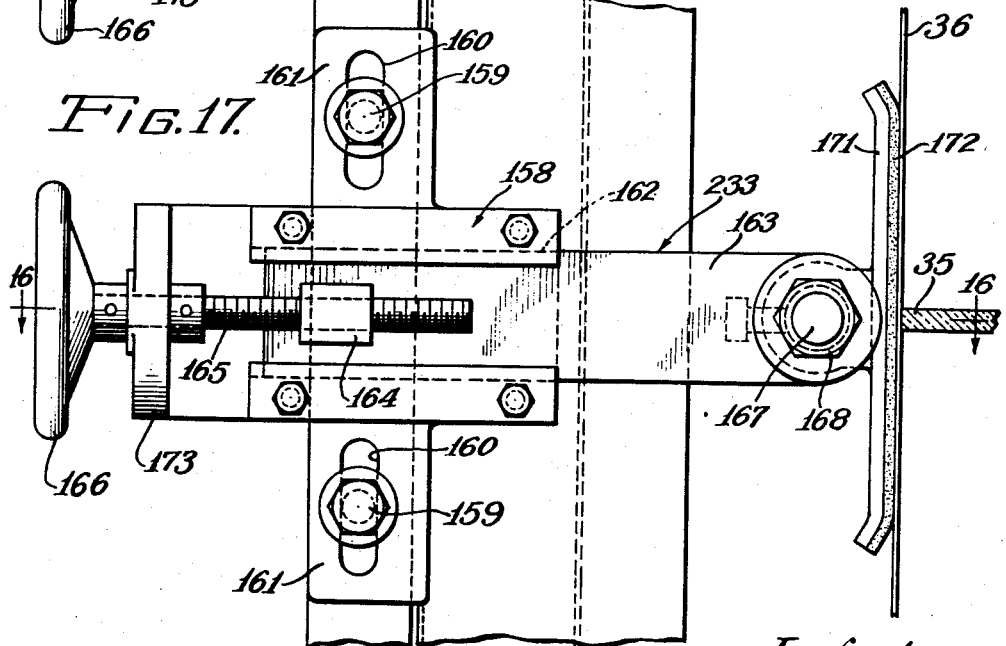
Fig. 17 is a side elevational view of the device which is shown in Fig. 16.

Fig. 20, and Fig. 20 is a side elevational view of the abrasive belt-guiding device which is illustrated in Figs. 16 and 17, and associated belt-guiding rollers, adjusted or positioned in such a manner as to cause the abrasive belt to form a beveled edge on the peripheral edge of a sheet of glass or like ceramic material disposed in contact therewith; and Fig. 19 is a view similar to Figs. 18 and 20 but showing the abrasive belt-guiding device which is illustrated in Figs. 18 and 20 positioned to provide a beveled edge on a glass sheet but which beveled edge has a somewhat different and sharper angle than the beveled edge which is formed on the glass sheet when the parts are positioned as shown in Fig. 20.

A typical embodiment of the invention is illustrated in Figs. 1 to 20, inclusive, and this form of the invention is particularly adapted and constructed and arranged for polishing and grinding the peripheral edges of substantially circular sheets of glass or like ceramic material such as the glass disc which is indicated at 35. This form of the invention comprises, in general, two units, namely, a device for holding and rotating a substantially circular sheet or disc 35 of glass or like ceramic material and a device for operating a movable abrasive member, such as the abrasive endless belt 36, in contact with the peripheral edge of the substantially circular glass sheet or disc 35.

In order that the general mode of operation of the invention may better be understood, it may be stated, before proceeding with a detailed description of the form of the new glass grinding and polishing machine which is illustrated in Figs. 1 to 20, inclusive, that in the use of the same the substantially circular glass sheet or disc 35 is mounted upon a turntable 37 which includes a rubber ring 38 whereon the circular glass sheet or disc 35 is held by means of vacuum exerted through a line 39, the turntable being rotated by a motor-driven mechanism which will be described hereinafter.

The moving abrasive endless belt 36 is guided over suitable guide rollers, such as 40 and 41, which are mounted in a supporting frame 42, and the abrasive belt 36 is moved in a generally vertical direction by means of a motor-driven operating unit which is indicated at 43 in the drawings.

In the use of that form of the new glass grinding and polishing mechanism which is illustrated in Figs. 1 to 20, inclusive, the substantially circular glass sheet or disc 35 is arranged on the turntable 37—38 and suction or vacuum is applied thereto, through the line 39, so as to hold the circular glass sheet or disc 35 on the turntable 37 which is urged, by a weight 85 and associated parts, toward the abrasive belt 36, so as to yieldingly urge the peripheral edge of the circular glass sheet or disc 35 on the turntable 37 into contact with the moving abrasive endless belt 36 and thus grind or polish the peripheral edge of the glass sheet or disc 35, as will be explained more in detail hereinafter.

Having thus indicated briefly the general mode of operation of the invention, a detailed description of the construction of that form of the same which is illustrated in Figs. 1 to 20, inclusive, will now be given.

*Turntable and glass disc-holding device*

The turntable and glass disc-holding or suction device which are embodied in the form of the new glass grinding and polishing machine which is shown in Figs 1 to 20, inclusive, is best illustrated in Figs. 5, 6 and 7, and comprises a rotary turntable 37 having an upright side wall 44 and top wall 45. An internally grooved or channel-shaped rubber ring 38 embraces the peripheral edge portion of the top wall 45 of the turntable 37 and the circular glass sheet or disc 35 rests on this rubber ring and is thereby spaced slightly above the top wall 45 of the turntable 37, thus providing a space or area 46 between the top wall 45 of the turntable and the bottom of the glass disc 35 which is arranged thereon.

Communicating with the area 46 is a suction or vacuum line 39 and this line 39 is arranged within a tubular shaft 47 on which the turntable 37 is mounted, this shaft 47 being journaled in bearings 48 which are, in turn, carried by a supporting structure 49 which is mounted on the supporting frame 50 of the machine.

The suction or vacuum line 39 communicates, by way of a line 51, with line 52 which extends between the vacuum tank 53 and an air exhaust pump 54 which is driven by a motor 55 which is mounted on turntable-supporting carriage 50, the motor 55 being operatively connected to the pump 54 by means of a suitable power-transmitting mechanism such as the belt 56 and pulley 57.

A manually operable three-way valve 58 is arranged in the line 51 and a line 70 extends from the vacuum tank 53 to the operating motor 55 for the exhaust pump 54. An automatic control device 71 is arranged in this line 70 so as to control the speed of the motor 55 in accordance with the degree of vacuum or air pressure in the vacuum tank 53.

Arranged in the line 70, adjacent the vacuum tank 53, is a pressure responsive device 70A (Fig. 5) which may be a pressure-responsive switch for controlling operation of the motor 55 for the vacuum pump 54 so as to maintain a predetermined pressure in the vacuum tank 53.

The operating or rotating shaft 47 for the turntable 37 is driven through a clutch 59 and carries a gear 60 which meshes with a gear 61 which forms a part of a speed-reducing gear mechanism 62. This speed-reducing gear mechanism 62 is operated by means of a suitable power transmission device which is shown as comprising a shaft 63, pulley 64, belt 65, pulley 66 and motor 67, all of which parts are mounted on the turntable-supporting carriage 50, the belt 65 and the pulley 64 being preferably of the V-shaped type and the pulley 66 being preferably a so-called Reeves or other similar type of pulley.

Associated with one element 72 of the clutch 59 is a yoke 73 which carries a manually operable handle or hand lever 74 for effecting engagement and disengagement of the clutch 59.

The turntable-operating motor 67 and the pulley 66 which is mounted on the shaft 68 of the motor 67 are adjustably mounted on the supporting frame 50, as shown in Fig. 7, and may be manually adjusted by means of a screw 69, which is provided with a handle 69A (Fig. 5), so as to vary the friction between the belt 65 and the pulleys 64 and 66 and thus vary the speed of the operating mechanism for the turntable 37 and the speed of rotation of the latter and the circular glass sheet or disc 35 carried thereby.

*Turntable-supporting carriage and track structure*

The turntable-supporting carriage 50 includes oppositely disposed guide rollers 75 arranged at the sides thereof (Fig. 6). These guide rollers 75 ride on trackways 76 which are arranged upon the top of an undercarriage 77 and at opposite sides thereof.

Mounted upon an upward extension 78 of the undercarriage 77 is a pulley 79 and working over this pulley is a flexible element in the form of a chain 80. This chain 80 is adjustably attached, between its ends, as at 81, to an upward extension or arm 82 of the turntable-supporting carriage 50, one end portion of this flexible element or chain 80 being adjustably attached, as at 83, to an upward extension 84 of the undercarriage 77. A slide rod 86 is attached to a depending end portion of the flexible element or chain 80, said slide rod 86 being slidably guided, as at 87, in the undercarriage 77, and a series or group of scale weights 83 are mounted on the slide rod 86. The weights 83 serve to yieldingly urge the turntable-supporting carriage 50 and the turntable 37 carried thereby from left to right, as seen in Fig. 4, that is, toward the movable abrasive endless belt 36, so as to yieldingly urge the peripheral edge portion of the circular glass sheet or disc 35, which is mounted on the turntable 37, into contact with the abrasive surface of the abrasive belt 36, and the number of the scale weights 85 may be varied so as to vary the pressure of the peripheral edge portion of the glass sheet or disc 35 against the abrasive belt 36, the turntable carriage 50 being guided by movement of the guide rollers 75 over the trackways 76.

Figure 1:
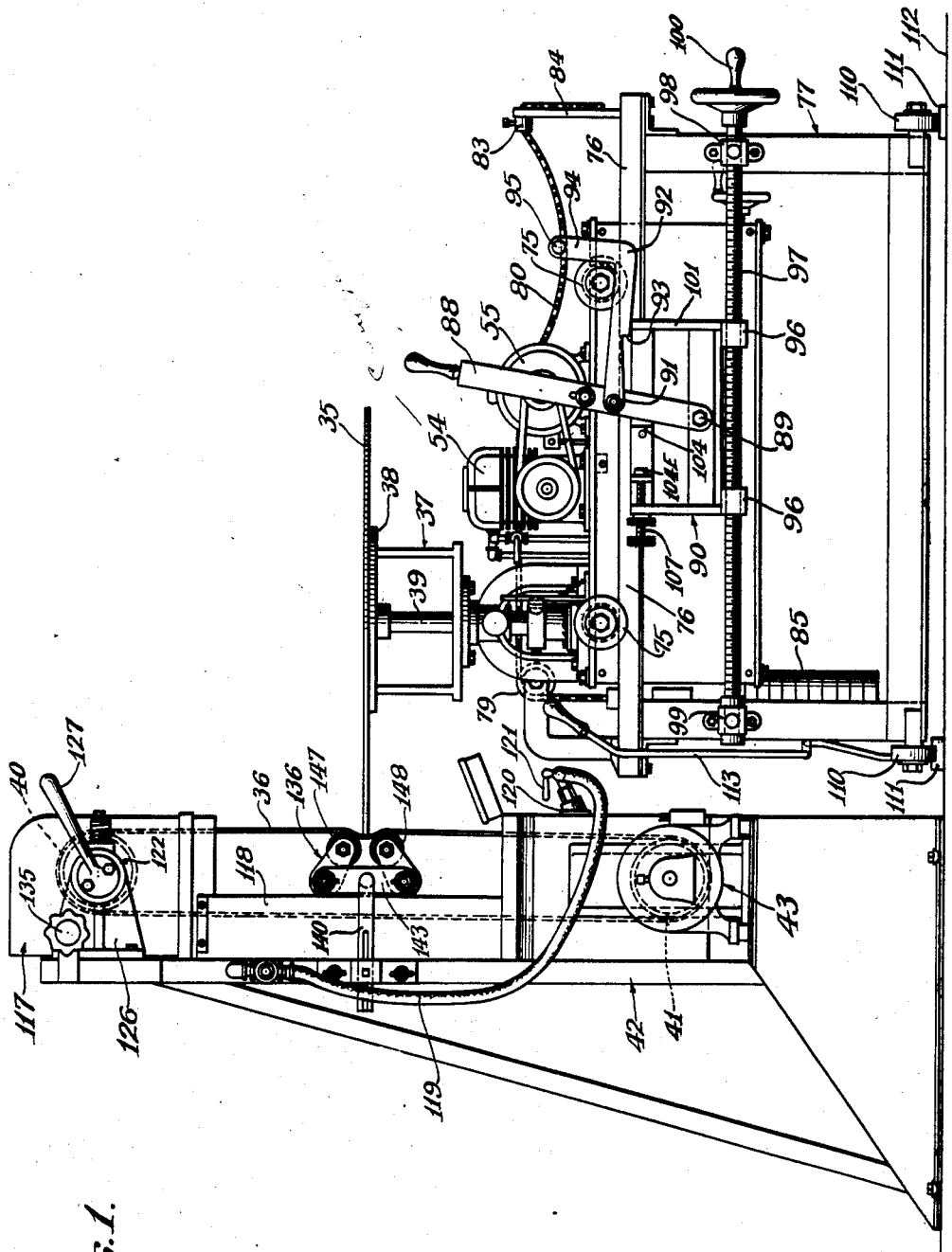
Fig. 1 is a side elevational view of a preferred form of the new glass grinding and polishing apparatus which is particularly constructed and arranged for grinding or polishing the peripheral edge of a substantially circular sheet or disc of glass or like ceramic material.
Figure 2:
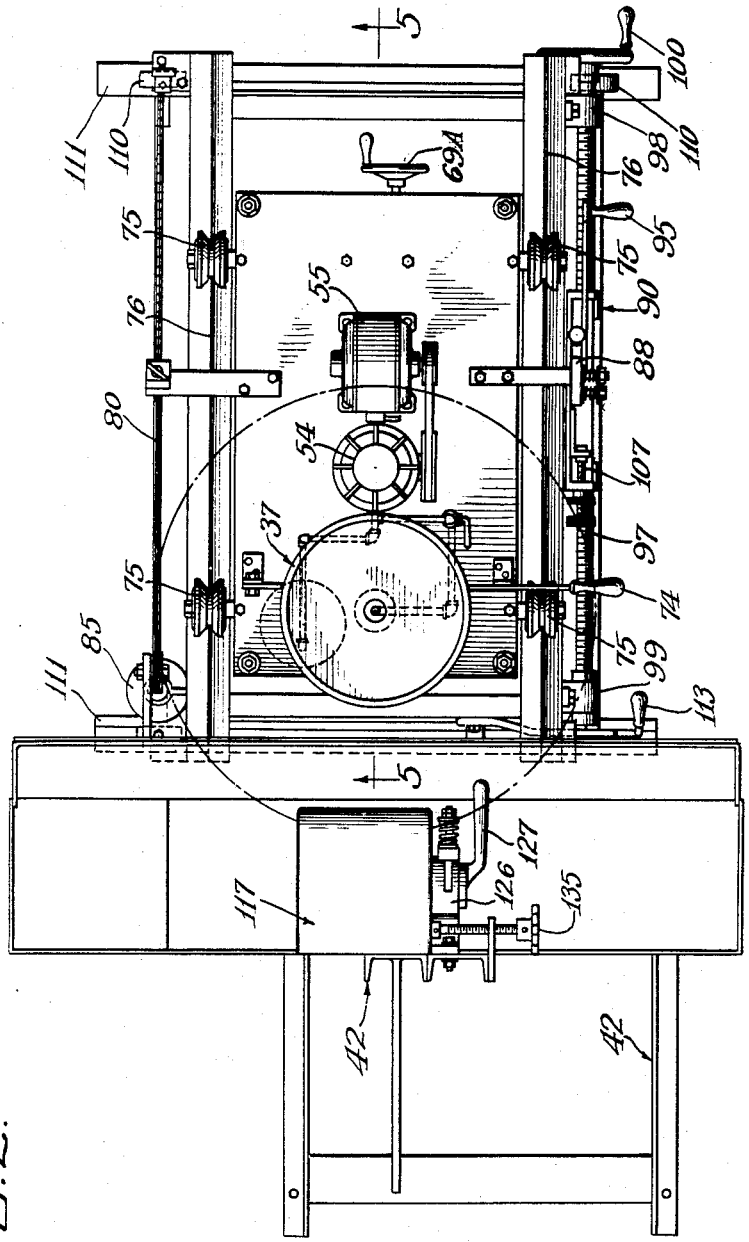
Fig. 2 is a top plan view of the apparatus which is illustrated in Fig. 1.

A hand lever 88 is pivotally mounted at its lower end, as at 89, upon a follower 90 and pivotally connected to this hand lever 88 between its ends as at 91, is a latch lever or dog 92 which has a notched portion 93, as best shown in Figs 1 and 9. This latch lever or dog 92 has an upwardly extending arm 94 which is provided with a handle 95. The follower 90 includes a pair of threaded guide members 96 and threaded through these guide members is an adjusting screw 97 which is rotatably mounted at its ends, as at 98 and 99, on the undercarriage. A handle or hand wheel 100 is provided at the outer end of the screw 97 to facilitate operation thereof.

The notched portion 93 of the latch dog or lever 92 is adapted for latching engagement with a latch keeper 101 which is provided on the follower 90.

The follower 90 is provided with upwardly extending arms 102 which are slidably guided between the trackways 96 and beveled upper end portions 103 which are provided on the undercarriage 77, as shown in Fig. 10.

Slidably mounted on the follower 90, (Figs. 8 and 9), as by means of a pin and slot connection 104A and 104B, respectively, is an adjustable stop 104 and the lever 88 is adapted to engage against one end portion 104C of this stop, under conditions which will be described presently. The slidable stop 104 also has a right angularly extending arm 104D which is provided with a resilient bumper 104E and an adjusting screw 107, which is mounted in an arm 107A of the follower 90, bears at its inner end against the arm 104D of the adjustable stop 104 so as to vary the position of the latter to the hand lever 88.

The hand lever 88 is connected between its ends to the turntable-supporting carriage 50 by means of a pin and slot connection 105—106, as best shown in Figs. 9 and 10, and a spring 109 on the bolt 105 normally urges the hand lever 88 against the frame of the turntable-supporting carriage 50.

In order to effect an approximate adjustment between the turntable-supporting carriage 50, the turntable 37 and the glass sheet or disc 35 carried thereby relative to the abrasive belt 36, the hand lever 88 is retracted (left to right, Fig. 1) and the notched portion 93 of the latch dog 92 is engaged with the latch keeper 101 provided on the follower 90. The screw 97 is then manipulated, by means of the hand wheel 100 thereon, so as to adjust the turntable-supporting carriage 50 relative to the undercarriage 77 and thus effect an approximate adjustment of the turntable-supporting carriage 50, the turntable 37, and the glass sheet or disc 35 carried thereby relative to the movable abrasive belt 36. The latch dog 92 is then released from latching engagement, at 93—101, with the follower 90, whereupon the weights 85 urge the turntable-supporting carriage 50, the turntable 37 and the glass disc 35 carried thereby toward the abrasive belt 36 so as to urge the peripheral edge portion of the glass sheet or disc 35 into engagement with the movable abrasive belt 36.

It will be noted that when the turntable-supporting carriage 50 is adjusted relative to the undercarriage 77, in the manner described above, the follower 90 is guided by its upwardly extending arms 102, which are disposed between the trackways 76 and the beveled upper edges 103 of the undercarriage 77, and that when the latch dog 92 is released from latching engagement with the latch keeper 101, the hand lever 88 may be moved into engagement with the end portion 104C of the stop 104 (Figs. 8, 9 and 10) so as to effect such an adjustment between the turntable-supporting carriage 50, the turntable 37 and the glass sheet or disc 35 carried by the turntable as will enable the relatively rough or jagged edges on the peripheral edge of the glass disc 35 to be polished off by contact with the abrasive surface of the abrasive belt 36.

The hand lever 88 may be moved laterally against the action of the springs 108 and 109 (Fig. 10) which are arranged on the bolts 89 and 105, so as to clear the end portion 104C of the stop 104 whereupon the hand lever 88 may be moved into engagement with the resilient element or bumper 104E which is carried by the arm 104D of the stop plate 104, the screw 107 being adjusted to vary the position of the stop plate 104 on the follower 90 and consequently the position of the turntable-supporting carriage 50 and the turntable 37 carried thereby relative to the undercarriage 77 and the abrasive belt 36.

The under-carriage 77, the turntable-supporting carriage 50, the turntable 37, and the circular glass sheet or disc 35 carried thereby, may also be adjusted laterally relative to the movable endless abrasive belt 36 on rollers 110 which are movable on trackways 111 which are mounted upon the supporting surface or bed 112 of the machine.

As best shown in Figs. 1 and 6, a hand lever 113 is pivotally connected between its ends, as at 114, to the undercarriage 77 and this lever 113 is also pivotally connected at its lower end, as at 115, to an upward extension 116 of one of the trackways 111.

In order to effect lateral adjustment of the turntable-supporting carriage 50, the turntable 37, and the glass sheet or disc 35 carried thereby, relative to the abrasive belt 36, the hand lever 113 may be manipulated and pivoted at 114 so as to move the undercarriage 77 laterally upon its supporting rollers 110 and along the trackways 111, this movement being effected by reason of the pivotal interconnection 114 between the hand lever 113 and the pivotal interconnection 115 between the hand lever 113 and the stationary upward extension 116 of the guide rail 111.

It will thus be seen that by adjusting the turntable 37, its supporting carriage 50, and the undercarriage 77, laterally it is possible to utilize or use up, at different times, the entire effective abrasive surface of the abrasive belt 36.

Abrasive belt supporting and operating mechanism

As shown in the drawings, the abrasive endless belt 36 works over guide rollers 40 and 41 which are mounted upon an upright supporting frame 42 and in the form of the invention which is illustrated in Figs. 1 to 20, inclusive, the supporting frame 42 for the abrasive belt 36 is shown as being stationarily mounted adjacent the turntable 37, the turntable-supporting carriage 50, and the undercarriage 77. The abrasive belt 36 may be operated in any suitable manner as, for example, by means of a suitable power transmission unit 43 which is mounted on the supporting frame 42.

Figure 3:
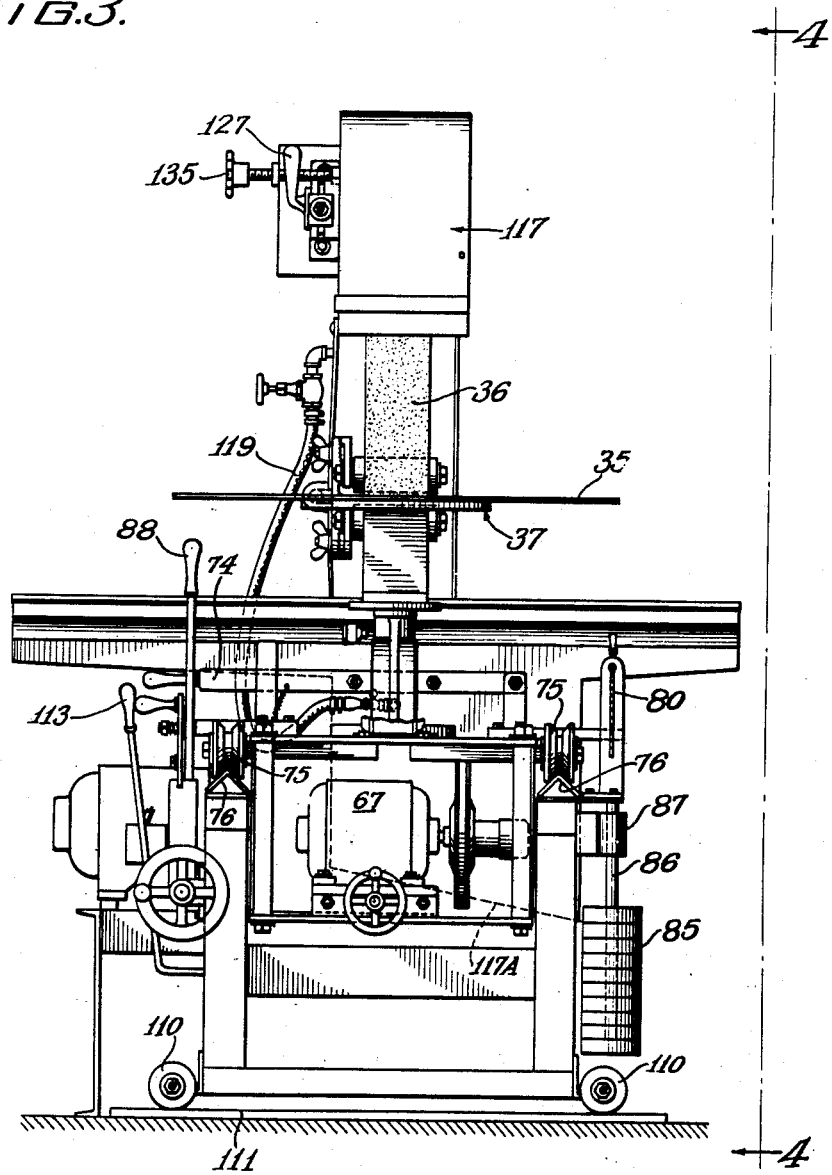
Fig. 3 is a front end elevational view of the same.

The rear lap and the upper and lower portions of the front lap of the abrasive belt are enclosed within a housing 117 which is open at its front side so as to expose the central portion of the front lap of the abrasive belt. The housing 117 includes a sheet of flexible material 118, such as rubber or the like, which extends around the rear and the sides of the rear lap of the abrasive belt 36 so as to prevent tearing of or damage to the abrasive belt 36 when the path of travel of the front lap thereof is varied and adjusted, as will be explained more fully hereinafter. A drain 117A is provided at the bottom of the housing 117 (Fig. 3).

In order to prevent overheating of the abrasive belt 36 during the polishing and grinding operations, a hose 119 is mounted on the supporting frame 42 and is adapted to be connected to any suitable source of water. This hose 119 is connected, at its lower end, to a nozzle 120 which is mounted on the supporting frame 42, facing the abrasive surface of the front lap of the abrasive belt 36 and this nozzle 120 is controlled by a suitable hand valve 121 for the purpose of directing a stream of water from the supply hose 119 against the abrasive surface of the front lap of the abrasive belt 36 which engages the peripheral edge of the circular glass sheet or disc 35.

Abrasive belt tensioning device shown in Figs. 14 and 15

The present invention includes the provision of a novel device for tensioning the abrasive belt 36, and this belt-tensioning device is shown in detail in Figs. 14 and 15 wherein it is generally indicated at 122.

The belt-tensioning device 122 is mounted on a supporting bracket 123 which is, in turn, mounted on the supporting frame 42 for the abrasive belt 36, adjacent the upper end of the supporting frame 42. The belt tensioning device 122 includes a rotatable shaft 124 and the upper guide roller 40 for the abrasive belt 36 is mounted on this shaft 124. The shaft 124 carries a block 125 which is eccentrically mounted thereon, as shown in Figs. 14 and 15.

The eccentric block 125, which is mounted on the shaft 124, works in a housing 126 which is formed as a part of the bracket 123 and the eccentric block 125 is provided with an operating handle 127.

A slot 128 is formed in the housing 126 and projecting through this slot, and fastened in the eccentric block 125, is a bolt 129, on which a friction block 130 is mounted. This friction block 130 is urged into engagement with the outer surface of the housing 126 by means of a spring 131 which is mounted on the bolt 129.

In the use of the new glass grinding and polishing machine, the abrasive belt 36 may be tensioned by manipulating the handle 127, the eccentric element 125, the shaft 124, and the guide roller 40 on the shaft 124, so as to vary the tension of the upper guide roller 40 upon the abrasive belt 36, and the parts may be held in any desired adjusted position by the friction of the spring-urged block 130 against the outer surface of the housing 126.

The belt tensioning device 122, which is shown in Figs. 14 and 15, also includes means for adjusting the upper guide roller 40 (for the abrasive belt 36) laterally. This adjusting means takes the form of an adjusting screw 132, which is attached at its inner end to the supporting bracket 123, as at 133. This screw 132 is also mounted in an arm 134 of the supporting frame 42, and a handle or hand wheel 135 is provided on the screw 132 for manipulating the same.

Abrasive belt guiding and controlling device shown in Figs. 11 to 13, inclusive The new glass polishing and grinding machine includes novel means for varying and controlling the angle at which the abrasive surface of the abrasive belt 36 engages the peripheral edge portion of a circular glass sheet or disc 35 supported upon the turntable 37 and for varying and controlling the path of travel of the abrasive belt 36 at the point where its abrasive surface engages the peripheral edge portion of the glass disc 35 so as to control and vary the effect and the angle or curvature imparted to the peripheral edge of the circular glass sheet or disc 35 by the abrasive belt 36.

One embodiment of the novel means for controlling and varying the angle at which the abrasive belt 36 engages the peripheral edge portion of the glass sheet or disc 35, carried by the turntable 37, is shown in detail in Figs. 11 to 13, inclusive, wherein it is generally indicated at 136. This device 136 comprises a supporting bracket 137 which is removably mounted on the upright supporting frame 42 for the abrasive belt 36, by means of fastening elements such as bolts 138, and slidably mounted in a suitable bearing surface 139, which is provided in the bracket 137, is a supporting arm or rod 140. This rod 140 may be adjusted in the bearing surface 139 and may be held in any desired adjusted position by means of a set screw 141 which is mounted in the bracket 137 and engages in a groove 140A which is formed in the supporting rod 140 to prevent the latter from turning or rotating.

The supporting rod 140 has a right-angularly and inwardly extending arm 142 which extends into the belt housing 117 between the front and rear laps of the abrasive belt 36, as best shown in Fig. 11. Mounted upon the inwardly extending arm 142 of the supporting rod 140 is a supporting arm 143 which is adjustable about and relative to the arm 142 and may be held in any desired adjusted position thereon by means of a set screw 144 which is mounted in the collar 143 and which bears, at its inner end, against the arm 142 of the supporting rod 140.

A pair of roller hangers 145 and 146 are pivotally mounted on the supporting arm 143, one adjacent each end portion thereof. The roller hanger 145 carries a guide roller 147 and the hanger 146 carries a similar guide roller 148, these guide rollers 147 and 148 being rotatably mounted on stub shafts 150 and 151 which are carried by the hangers 145 and 146, respectively, (Fig. 12).

The hangers 145 and 146 and the belt guiding rollers 147 and 148 which are carried thereby are on the supporting arm 143, adjustable about their supporting pivots 152 and 153, respectively, so as to dispose the belt-guiding rollers 147 and 148 in various positions relative to each other and relative to the front lap of the abrasive belt 26, as will be described more in detail presently, and the guide roller hangers 145 and 146, and the guide rollers 147 and 148, respectively, which are carried thereby may be held in any desired adjusted position by means of clamping devices "J," one of which is illustrated in Fig. 13.

Each of the clamping devices "J" comprises a serrated edge 154, one of which is formed on each of the hangers 145 and 146, and a complementary serrated edge 155 which is formed on the supporting arm 143, and which is engageable with the serrated edges 154 which are formed on the hangers 145 and 146. Each of the clamping devices "J" also include a thumb nut, such as 156, one of which is mounted on the threaded outer end portion of each of the pivots or bolts 152 and 153 on which the roller-supporting hangers 145 and 146, respectively, are mounted.

A typical use of the belt adjusting device which is shown in Figs. 11, 12 and 13 is illustrated in Fig. 12 wherein it will be seen that when it is desired to grind or polish the peripheral edge of a circular glass or like ceramic sheet or disc 35 carried by the turntable 37, the belt-guiding rollers 147 and 148 are arranged on opposite sides of, that is to say, above and below the glass disc 35 and the peripheral edge of the glass disc 35 is caused to bear against the abrasive surface of the abrasive belt 36 at a point approximately midway between the guide rollers 147 and 148 so as to form a loop in the movable abrasive endless belt 36. Hence it will be seen that as the movable abrasive endless belt 36 travels in a generally vertical direction across the peripheral edge of the glass disc 35, the loop portion 157 thereof will grind or polish the peripheral edge of the glass disc 35 and eliminate jagged or rough edges thereon and will form a rounded polished surface on the peripheral edge of the glass disc 35.

It will also be noted, by reference particularly to Fig. 12, that the position of the roller hangers 145 and 146, and of the rollers 147 and 148 which are carried thereby, and the path of travel of the front lap of the abrasive belt 36, may be controlled and varied so as to control the angular configuration or curvature imparted to the peripheral edge of the glass disc 35 by the abrasive belt 36.

Thus, it will be noted that with the parts disposed in the position in which they are shown in full lines in Fig. 12, the abrasive belt 36 will follow the path "A," which is indicated in full lines in Fig. 12, whereas by moving the hangers 145 and 146, and the rollers 147 and 148 which are carried thereby into the positions in which these parts are shown in dotted lines in Fig. 12, the front lap of abrasive belt 36 will follow the path of travel in which it is shown in dotted lines, or in position "B," Fig. 12, and in which position it will impart a different angular configuration or curvature to the peripheral edge of the glass disc 35 than is imparted thereto when the front lap of the abrasive belt 36 follows the path of travel in which it is shown in full lines or in position "A" in Fig. 12.

It will be seen, therefore, that by adjusting the hangers 145 and 146, and the rollers 147 and 148 which are carried thereby, it is possible to control and vary the path of travel of the front lap of the abrasive belt and, consequently, the curvature or configuration imparted to the peripheral edge of the glass or like ceramic disc 35, which is mounted on the turntable 37.

*Modified form of abrasive belt guiding and controlling device shown in Figs. 16 to 20, inc.*

A modified form of guiding and controlling device for the abrasive belt 36 is shown in Figs. 16 to 20, inclusive, and this form of the new abrasive belt guiding and controlling device is particularly adapted for use where it is desired to form either a straight-sided edge or a beveled edge upon the peripheral edge of a substantially circular glass sheet or disc 35 carried by the turntable 37.

The form of the new abrasive belt guiding and controlling device which is shown in Figs. 16 to 20, inclusive, embodies a horizontally extending supporting bracket 158 which is adapted to be attached to the supporting frame 42.

The supporting bracket 158 may be attached to the supporting frame 42 in any suitable manner, as by means of bolts 159, which are projected through slots 160 which are formed in vertically extending arms 161 of the supporting bracket 158. Hence it will be seen that the supporting bracket 158 and the parts carried thereby are vertically adjustable on the supporting frame 42 by reason of the adjustable connection which is afforded by the bolts 159 and slots 160.

A channel-shaped groove 162 is formed in the supporting bracket 158 and a supporting arm 163 is slidably mounted in the groove 162. The supporting arm 163 is provided with a laterally extending internally threaded portion 164, and threaded into this portion 164 is an adjusting screw 165 which is provided with a handle in the form of a hand wheel 166. This adjusting screw 165 is also journaled in an opening which is formed in a laterally extending arm 173 of the bracket 158.

A supporting rod 167 is mounted on the outer end portion of the arm 163, and this rod 167 has a reduced end portion which is secured to the arm 163 by means of a nut 168 which is threaded thereon.

A collar 169 is slidably and rotatably mounted on the supporting rod 167, and this collar 169 may be held in any desired adjusted position upon the supporting rod 167 by means of a set screw 170 which is mounted in a threaded opening which is provided in the collar 169, the inner end portion of the set screw 170 bearing against the supporting rod 167.

A shoe 171 is preferably formed as an integral extension of the collar 169 and this shoe 171 is provided with a resilient facing 172, which may be made of any suitable material such, for example, as leather, rubber or the like, and the face 172 of the shoe 171 is adapted to bear against the inner or non-abrasive surface of the front or outer lap of the movable endless abrasive belt 36 so as to hold the abrasive surface of the front lap of the abrasive belt 36 in engagement with the peripheral edge of a glass or like ceramic disc carried by the turntable 37.

It will be noted, by reference to Figs. 16 and 17, that if and when it is desired to provide a straight-sided peripheral edge upon the circular glass sheet or disc 35, this may be accomplished by adjusting the shoe 171—172 so that the same extends in a substantially vertical plane with the face 172 thereof bearing against the inner or non-abrasive surface of the outer lap of the abrasive belt 36, causing the front lap of the abrasive belt 36 to run in a substantially vertical plane at the point where it engages the peripheral edge of the circular glass sheet or disc 35, and hence the engagement of the abrasive belt 36 with the circular glass sheet or disc 35 will form a straight-sided peripheral edge upon the glass sheet or disc 35 which is carried by the turntable 37.

It will also be noted, by reference to Figs. 16 and 17, that the shoe 171—172 may be adjusted into any desired position upon the supporting rod 167, and may be secured therein by means of the set screw 170.

It will also be seen, by reference to Fig. 17, that a limited vertical adjustment of the shoe 171—172 may be effected by adjusting the bracket 158 and its arms 161 upon the bolts 159 which project through the slots 160, and that the shoe 171—172 may be adjusted toward and away from the inner or non-abrasive surface of the front or outer lap of the abrasive belt 36 by means of the manually operable adjusting screw 165, and its handle 166, which, when rotated, caused the supporting arm 163 to slide in the channel-shaped groove 162 which is formed in the supporting bracket 158.

An adaptation of the modified form of the new abrasive belt guiding and controlling device, which is shown in Figs. 16 and 17, is illustrated in Figs. 18, 19 and 20, which illustrates the use of the parts which are shown in Figs. 16 and 17 in combination with the parts which are shown in Figs. 11 to 13, inclusive Since certain of the parts which are illustrated in Figs. 18 to 20, inclusive, are identical in construction with corresponding parts which are shown in Figs. 11 to 13, inclusive, these parts have been given the same reference numerals followed by the letter "A," and those parts which are shown in Figs. 18 to 20 which are identical in construction with corresponding parts which are shown in Figs. 16 and 17 have been given the same reference numerals.

It will be noted by reference to Fig. 19 that the path of travel of the front or outer lap of the movable abrasive belt 36 is such, as is indicated at "C," that it will form a beveled edge upon the glass sheet or disc 35 which is mounted on the turntable 37.

It will also be noted by reference to Fig. 19, that the path of travel of the front or outer lap of the abrasive belt 36, at the point where it engages the peripheral edge of the glass sheet or disc 35, and the resulting angle of the beveled edge formed on the latter, may be controlled by adjusting the upper guide roller hanger 145A, and the upper guide roller 147A which is mounted thereon, into the position in which these parts are shown in Fig. 19, and by adjusting the lower guide roller hanger 146A, and the belt guiding roller 148A, which is carried thereby, in the position in which these parts are shown in Fig. 19, and by adjusting the shoe 171—172 into the position in which it is shown in Fig. 19.

When the parts are arranged as in Fig. 19 the first lap of the abrasive belt 36 travels between the guide rollers 147A and 148A and across the face of the shoe 171—172 at an acute angle with respect to the plane of the upper surface of the glass disc 35, which is mounted on the turntable 37, thereby forming a beveled peripheral edge, having a desired bevel or angle, on the glass disc 35.

The parts which are illustrated in Figs. 18 and 19 are shown in Fig. 20 also adjusted into a position to form a beveled peripheral edge on the glass disc 35 but at a somewhat different angle than the angle formed by the abrasive belt 36 when the parts are positioned as in Fig. 19.

Thus it will be seen that when the parts are disposed as in Fig. 20, the outer or front lap of the abrasive belt 36 will travel in a path which is indicated "D" in Fig. 20, and will travel between the upper and lower guide rollers 147A and 148A, respectively, and across the face 172 of the shoe 171 at such an angle as to form a beveled peripheral edge.

The guide roller 148A (Figs. 18, 19 and 20) is preferably provided with a hardened metallic face to resist the abrasive action of the abrasive surface of the front lap of the abrasive belt 36 which bears thereagainst.

*General Operation of the Form of the Invention Which Is Illustrated in Figs. 1 to 20, Incl.*

In the use of that form of the new glass polishing and grinding machine which is illustrated in Figs. 1 to 20, inclusive, the abrasive belt 36 may be properly tensioned for operation by manipulating the operating handle 127 of the belt-tensioning device 122, which is shown in Figs. 14 and 15.

In the event that it is desired to form a rounded peripheral edge on the circular glass sheet or disc 35, which is carried by the turntable, the belt-guiding device which is illustrated in detail in Figs. 11, 12 and 13 may then be employed and the roller hangers 145 and 146, and the belt-guiding rollers 147 and 148 carried thereby may then be positioned either as shown in full lines or as shown in dotted lines in Fig. 12, or in any other desired position, so as to control the path of travel of the front or outer lap of the abrasive belt 36, where its abrasive surface engages the peripheral edge of the glass disc 35; the position of the hangers 145 and 146 and the guide rollers 147 and 148 depending upon the particular curvature or configuration which it is desired to impart to the peripheral edge of the glass sheet or disc 35.

In the event, however, that it is desired to form a flat or straight-sided peripheral edge on the glass or like ceramic sheet or disc 35, which is carried by the turntable 37, the belt-guiding device which is illustrated in detail in Figs. 16 and 17 may be employed and the shoe 171—172 may then be adjusted into and clamped, by means of the set screw 170, in a substantially vertical position, as shown in Fig. 17, so that the front or outer lap of the abrasive belt 36 will travel in a substantially vertical plane or path at the point where its abrasive surface engages the peripheral edge of the glass disc 35.

However, in the event that it is desired to form a beveled peripheral edge on the glass or like ceramic sheet or disc 35, which is carried by the turntable 37, the belt-guiding device which is illustrated in detail in Figs. 18, 19 and 20 may be employed and, depending upon the degree or angle of the bevel which it is desired to form on the peripheral edge of the glass disc 35 the hangers 145A and 146A and the belt-guiding rollers 147A and 146A, respectively, which are carried thereby, and the shoe 171—172, may be adjusted into and clamped in either the position in which these parts are shown in Fig. 19 or in the position in which they are shown in Fig. 20, or in various other positions, so as to vary and control the path of travel of the front or outer lap of the abrasive belt 36, at the point where the abrasive surface thereof engages the peripheral edge of the glass disc 35; the adjustment of the parts and the consequent path of travel of the front or outer lap of the abrasive belt 36 depending upon the degree or angle of the bevel which it is desired to form in the peripheral edge of the circular glass sheet or disc 35 which is carried by the turntable 37.

By reference to Figs. 11 and 12 and 16 and 17 it will be noted that the abrasive belt-guiding and controlling device which is shown in Figs. 16 and 17 (or that which is shown in Figs. 18, 19 and 20) may be readily substituted for the abrasive belt-guiding and controlling device which is shown in Figs. 11 and 12 by merely replacing the supporting bracket 137, which supports the rod 140 upon the supporting frame 42 of the abrasive belt-supporting and operating structure, and the rod 140 and associated parts, with the supporting bracket 158 and its supporting arm 153 and associated parts.

The selected parts of the abrasive belt-guiding and controlling device having thus been adjusted, as desired, the abrasive belt 36 may then be set in motion by closing a suitable starting switch (not shown) associated with the motor-driven operating mechanism 43 for the abrasive belt 36.

The substantially circular sheet 35 of glass or like ceramic material may then be placed upon the turntable 37 and the turntable-supporting carriage may then be manipulated into its initial position, relative to the abrasive belt 36, by manipulating the hand lever 88 (from left to right, as seen in Fig. 1) so as to latchingly engage the latch dog 93 with the latch keeper 101 which is provided on the follower 93 which is carried by the screw 97. The adjusting screw 97 may then be rotated, by means of its operating handle or hand wheel 100, and this movement of the screw 97 acts, through the follower 90 thereon, to dispose the turntable-supporting carriage 50, the turntable 37 carried thereby, and the peripheral edge of the glass sheet or disc 35 mounted thereon in approximate adjustment with or relative to the abrasive surface of the abrasive belt 36.

The latch dog 92 may then be moved out of latching engagement with the latch keeper 101 on the follower 90, which is carried by the screw 97, by lifting the latch dog 92, by means of its handle 93, the latch dog 92 pivoting at its pivotal connection 91 with the hand lever 88. The peripheral edge portion of the glass disc 35 on the turntable 37 will then be urged into yielding engagement with the abrasive surface of the front lap of the abrasive belt 36 by means of the weights 85 acting through the flexible element or chain 80, which is attached, as at 81, to the upwardly extending arm 82 of the turntable-supporting carriage.

It will be noted, in this connection, that it is desirable to limit the yielding pressure or contact of the peripheral edge portion of the glass sheet or disc 35 against the abrasive surface of the front or outer lap of the abrasive belt 36 until the rough or jagged points or surfaces on the peripheral edge of the glass sheet or disc 35 have been polished off by engagement with the abrasive surface of the front lap of the abrasive belt 36 and this is accomplished by means of the stop plate 104 which is adjustably mounted on the follower 90, as best shown in Figs. 8, 9 and 10.

It will be noted, in this connection, that after the latch dog 92 has been pivoted, at 91, out of latching engagement with the latch keeper 101 on the follower 90, the weights 85 act, through the flexible element or chain 80, to urge the turntable-supporting carriage 50, toward the abrasive belt 36, the turntable-supporting carriage traveling upon its supporting rollers 75 which ride upon the guideways 76. As the turntable-supporting carriage 50 is thus urged toward the abrasive belt 36, the hand lever 88 engages the end portion 104C of the stop plate 104 which is adjustably mounted on the follower 90, thereby limiting the extent to which the turntable-supporting carriage 50 may be moved, by the weights 85, toward the abrasive belt 36, it being understood, in this regard, that the screw 97 which carries the follower or traveler 90 and the adjustable stop plate 104 thereon is carried by the undercarriage 77 which is adjustable laterally, upon the rollers 110 and trackways 111, relative to the abrasive belt 36, but said undercarriage 77 is not adjustable or movable toward or away from the abrasive belt 36.

After the rough or jagged points or surfaces on the peripheral edge of the glass disc 35 have been eliminated, by engagement with the abrasive surface of the abrasive belt 36, in the manner described above, the turntable-supporting carriage 50, the turntable 37 carried thereby, and the glass disc 35 on the turntable 37, may then be freed to enable the weights 85 and the flexible element 80 to urge the peripheral edge portion of the glass sheet or disc 35 into firmer contact or engagement with the abrasive surface of the front or outer lap of the abrasive belt 36. This may be accomplished by moving the hand lever 88 laterally, against the action of the spring 109, (right to left as seen in Fig. 10 or top to bottom as seen in Fig. 8) so that it will clear the end portion 104C of the stop plate 104 whereupon the turntable-supporting carriage 50 will be urged closer to the abrasive belt 36, by the weights 85 and flexible element 80, until the hand lever 88, (which in the meantime has been returned to its inner position by the spring 109), engages the resilient element or bumper 104E which is provided on the adjustable stop plate 104.

It will be noted, in this connection, that the extent to which the turntable-supporting carriage 50, the turntable 37 carried thereby and the glass disc 35 mounted on the turntable 37, may be urged toward the abrasive belt 36, and the pressure with which the peripheral edge of the glass disc 35 engages the abrasive belt 36, may be controlled and varied by adjustment of the stop plate 104 on the follower 90, this being accomplished by manipulating the adjusting screw 107 (Figs. 8 and 9) and then clamping the parts in the desired adjusted position by means of the clamping nut 107A which is provided on the screw 107 and is adapted to engage against a portion 90A of the traveler or follower 90.

The foregoing adjustment of the stop plate 104, by means of the screw 107 makes it possible to feed the peripheral edge of the glass 35 very gradually toward the abrasive belt 36 and thus impart a high degree of polish to the peripheral edge of the glass disc 35.

During the foregoing adjustment of the stop plate 104 the same is guided by the attaching element 104A thereon working in the slot 104B which is formed in a portion of the follower or traveler 90 which is carried by the screw 97 (Fig. 8).

When the substantially circular glass or like ceramic sheet 35 has been positioned upon the turntable 37, the manually operable valve 58 (Fig. 5) may be moved into position to establish communication between the vacuum line 39—51 to the vacuum chamber or area 46 in the turntable 37 and the vacuum tank 53, by way of the line 57; it being understood, in this connection, that the vacuum pump 54, which is operated by the motor 55, belt 56 and pulley 57, (all of which parts 55—56—57 are mounted on and are movable with the turntable-supporting carriage 50) maintains a vacuum or partial vacuum in the vacuum tank 53.

Accordingly, when communication is thus established between the vacuum tank 53 and the vacuum chamber 46 in the turntable 37, by way of the line 52, valve 58, and line 51—39, a partial vacuum is formed in the vacuum chamber 46, thereby securely holding the substantially circular glass sheet or disc 35 upon the turntable 37, the vacuum chamber 46 in the turntable 37 being thus completed and defined by the top wall 45 of the turntable 37, the bottom surface of the glass disc 35, and the flexible sealing or rubber ring 38 on the turntable 45, on which sealing ring the glass disc 35 rests and with which it has air tight or sealing engagement.

The turntable shaft 47 may then be operatively connected to the motor-driven turntable-operating and speed-reducing mechanism 67—68—65—64—63—62—61 and associated parts, by manipulating the clutch-operating lever 74 (Figs. 5 and 6) and its yoke 73 so as to engage the two parts 72 and 59 of the clutch 72—59, whereupon the turntable 37 and the glass disc 35 supported thereon may then be rotated, with the peripheral edge of the glass disc 35 in engagement with the abrasive surface of the abrasive belt 36, by closing the control switch (not shown) to the turntable-operating motor 67.

By reference to Fig. 5 it will be noted that the position of the turntable-operating motor 67 on the turntable-supporting carriage 50 may be varied by turning the hand wheel 69A and the adjusting screw 69 which are operatively connected to the casing of the motor 67 so as to vary the tension of the V-shaped belt 65 on the V-shaped pulley 64 and thus vary the speed of rotation of the turntable 37 and the glass disc 35 carried thereby.

In order to utilize the entire abrasive surface or width of the abrasive belt 36, and to prevent the same from being worn or utilized only at the point of contact between the peripheral edge of the glass disc 35 and the abrasive surface of the abrasive belt 36, the undercarriage 77 and the turntable-supporting carriage 50 and the turntable 37 carried thereby may be adjusted laterally relative to the abrasive belt 36 by manipulating the hand lever 113 (Fig. 6) so as to move the undercarriage 77 (and the turntable-supporting carriages 50 and the turntable 37 carried thereby) along the trackways 111.

The abrasive belt 36 may be cooled, during the use of the new glass grinding and polishing machine which is shown in Figs. 1 to 20, inclusive, by opening the valve 121 so as to direct a stream of water against the front lap of the abrasive belt, adjacent the lower portion of the belt housing 117, by way of the hose 119 and nozzle 120, the water thus directed into the belt housing 117 being carried away by the drain 117A which is provided at the bottom of the belt housing 117.

It will be seen from the foregoing description of the present invention, taken in conjunction with the accompanying drawings, that the present invention, in one form thereof, provides a new and relatively simple but efficient and time and labor saving machine for grinding or polishing the peripheral edge of a substantially circular sheet of glass or like ceramic material so as to form either a polished straight-sided flat edge, or a beveled edge, or a rounded edge, thereon, as may be desired.

It will also be seen from the foregoing description, taken in conjunction with the accompanying drawings, that the present invention realizes and accomplishes its intended objects, including those which have been specifically set forth hereinabove, as well as those which are apparent from the foregoing description and the accompanying drawings.

While I have illustrated and described preferred embodiments of my invention it is to be understood that these are capable of variation and modification and I therefore do not wish to be limited to the precise details set forth but desire to avail myself of such changes and alterations as fall within the purview of the following claims:

I claim:

1. In a machine of the character described, the combination of, a movable abrasive endless belt, means for driving said movable abrasive endless belt, means including a turntable for supporting a sheet of ceramic material with an edge portion thereof disposed in engagement with the abrasive surface of said movable abrasive endless belt, means for rotating said turntable with said edge portion of said sheet of ceramic material in engagement with the abrasive surface of said movable abrasive endless belt, means for supporting said turntable including a supporting structure movable transversely, upon its supporting surface, relative to the abrasive surface of said movable abrasive endless belt, a turntable-supporting carriage carried by said supporting structure and movable relative thereto, and means including a gravity-attracted weight for yieldingly urging said turntable-supporting carriage and said turntable supported thereby, upon and relative to, said supporting structure, so as to urge an edge portion of said sheet of ceramic material carried by said turntable into yielding engagement with the abrasive surface of said movable abrasive endless belt.

2. In a machine of the character described, the combination of, a movable abrasive endless belt, means for driving said movable abrasive endless belt, means including a turntable for supporting a sheet of ceramic material with an edge portion thereof disposed in engagement with the abrasive surface of said movable abrasive endless belt, means for rotating said turntable with said edge portion of said sheet of ceramic material in engagement with the abrasive surface of said movable abrasive endless belt, means for supporting said turntable including a supporting structure movable transversely, upon its supporting surface, relative to the abrasive surface of said movable abrasive endless belt, a turntable-supporting carriage carried by said supporting structure and movable relative thereto, means for yieldingly urging said turntable-supporting carriage and said turntable supported thereby, upon and relative to, said supporting structure, so as to urge an edge portion of said sheet of ceramic material carried by said turntable into yielding engagement with the abrasive surface of said movable abrasive endless belt, and means for detachably latching said turntable-supporting carriage to said supporting structure against the action of said urging means.

3. In a machine of the character described, the combination of, a movable abrasive endless belt, means for driving said movable abrasive endless belt, means including a turntable for supporting a sheet of ceramic material with an edge portion thereof disposed in engagement with the abrasive surface of said movable abrasive endless belt, means for rotating said turntable with said edge portion of said sheet of ceramic material in engagement with the abrasive surface of said movable abrasive endless belt, means for supporting said turntable including a supporting structure movable transversely, upon its supporting surface, relative to the abrasive surface of said movable abrasive endless belt, a turntable-supporting carriage carried by said supporting structure and movable relative thereto, means for yieldingly urging said turntable-supporting carriage and said turntable supported thereby, upon and relative to, said supporting structure, so as to urge an edge portion of said sheet of ceramic material carried by said turntable into yielding engagement with the abrasive surface of said movable abrasive endless belt, means for detachably latching said turntable-supporting carriage to said supporting structure against the action of said urging means, and adjustable means carried by said supporting structure for limiting the movement of said turntable-supporting carriage, under the action of said urging means, upon and relative to said supporting structure and toward the abrasive surface of said movable abrasive endless belt.

4. In a machine of the character described, the combination of, a movable endless abrasive belt, means for driving said movable abrasive endless belt, a supporting structure including a turntable-supporting carriage movable toward and away from the abrasive surface of said movable abrasive endless belt, a turntable carried by said turntable-supporting carriage, means carried by said turntable-supporting carriage for holding a substantially circular sheet of glass or like ceramic material upon said turntable, means for rotating said turntable, means for yieldingly urging said turntable supporting carriage and said turntable carried thereby toward the abrasive surface of said movable abrasive endless belt, so as to urge the peripheral edge portion of said substantially circular sheet of glass or like ceramic material into yielding engagement with the abrasive surface of said movable abrasive endless belt, manipulative means for restraining the action of said urging means, and adjustable means for controlling and varying the path of travel of said movable abrasive endless belt in the zone where the abrasive surface of said movable abrasive endless belt engages the peripheral edge of said sheet of glass or like ceramic material carried by said turntable so as to control the configuration imparted to the peripheral edge of said sheet by the abrasive surface of said movable abrasive endless belt, said adjustable means comprising belt-guiding guide rollers adapted to bear against said abrasive endless belt, on the inner or non-abrasive surface thereof, and to urge the abrasive surface of said movable abrasive endless belt into engagement with the peripheral edge portion of said sheet of glass or like ceramic material carried by said turntable, one of said guide rollers being disposed above the top of said turntable and another of said guide rollers being disposed below the top of said turntable.

5. In a machine of the character described, the combination of, a movable endless abrasive endless belt, means for driving said movable abrasive endless belt, a turntable for supporting a sheet of glass or like ceramic material, means for supporting said turntable including a turntable-supporting carriage movable toward and away from said movable abrasive endless belt, means carried by said turntable-supporting carriage for holding a sheet of glass or like ceramic material upon said turntable, means for rotating said turntable, manipulative means for adjusting said turntable-supporting carriage and said turntable carried thereby toward and away from the abrasive surface of said movable abrasive endless belt so as to move an edge portion of said sheet of glass or like ceramic material carried by said turntable into and out of engagement with the abrasive surface of said movable abrasive endless belt, said supporting means including an undercarriage supporting said turntable-supporting carriage and movable transversely relative to the abrasive surface of said movable abrasive endless belt, and manipulative means for adjusting said undercarriage and said turntable-supporting carriage and said turntable carried thereby transversely relative to the abrasive surface of said movable abrasive endless belt.

6. In a machine of the character described, the combination of, a movable endless abrasive belt, means for driving said movable abrasive endless belt, a supporting structure including a turntable-supporting carriage movable toward and away from the abrasive surface of said movable abrasive endless belt, a turntable carried by said turntable-supporting carriage, means carried by said turntable-supporting carriage for holding a substantially circular sheet of glass or like ceramic material upon said turntable, means for rotating said turntable, means for yieldingly urging said turntable supporting carriage and said turntable carried thereby in a direction substantially perpendicular to the axis of rotation of said turntable toward the abrasive surface of said movable abrasive endless belt, so as to urge the peripheral edge portion of said substantially circular sheet of glass or like ceramic material into yielding engagement with the abrasive surface of said movable abrasive endless belt, manipulative means for restraining the action of said urging means, adjustable means for controlling and varying the path of travel of said movable abrasive endless belt in the zone where the abrasive surface of said movable abrasive endless belt engages the peripheral edge of said sheet of glass or like ceramic material carried by said turntable so as to control the configuration imparted to the peripheral edge of said sheet by the abrasive surface of said movable abrasive endless belt, said adjustable means comprising belt-guiding guide rollers adapted to bear against said abrasive endless belt, on the inner or non-abrasive surface thereof, and to urge the abrasive surface of said movable abrasive endless belt into engagement with the peripheral edge portion of said sheet of glass or like ceramic material carried by said turntable, one of said guide rollers being disposed above the top of said turntable and another of said guide rollers being disposed below the top of said turntable, and means for adjustably holding said abrasive belt-guiding rollers in various positions relative to each other and relative to the abrasive surface or lap of said movable abrasive endless belt which is adapted to engage the peripheral edge portion of said substantially circular sheet of glass or like ceramic material carried by said turntable.

7. A machine as described in claim 6 in which the adjustable means for controlling and varying the path of travel of said movable abrasive belt includes a belt-guiding member arranged between said belt-guiding rollers and adapted to bear against the inner surface of said lap of said movable abrasive endless belt in the zone where the abrasive surface of the said lap of said movable abrasive endless belt engages the peripheral edge of said substantially circular sheet of glass or like ceramic material carried by said turntable.

8. In a device of the character described, in combination, a turntable, means for rotating said turntable, means for supporting said turntable including a supporting structure movable, upon its supporting surface, in a path parallel to one axis of said supporting structure, a turntable-supporting carriage carried by said supporting structure for supporting said turntable, said turntable-supporting carriage being movably mounted upon said supporting structure for movement in a path at right angles to the said path in which said supporting structure is movable upon its supporting surface, means for yieldingly urging said turntable-supporting carriage and said turntable carried thereby upon and relative to said supporting structure and in one direction along said path in which said turntable-supporting carriage is movable relative to and upon said supporting structure, manipulative means for detachably latching said turntable-supporting carriage to said supporting structure and against the action of said urging means, and manipulative adjustable means for controlling and varying the extent of movement imparted to said turntable-supporting carriage by said urging means, upon and relative to said supporting structure, when said turntable-supporting carriage is unlatched from said supporting structure.

9. A device as described in claim 8 in which the means for yieldingly urging said turntable-supporting carriage upon, and relative to said supporting carriage includes a flexible element attached to said turntable-supporting carriage and a gravity-attracted weight carried by said flexible element.

PAUL MACA.